COLOR TELEVISION RECEIVER TINT AND CHROMA CONTROL NETWORK

Filed Oct. 26, 1967 2 Sheets-Sheet 1

INVENTORS
DONG W. RHEE &
KAROL SIWKO
BY
Robert E. Strauss
ATTORNEY

July 21, 1970 DONG W. RHEE ET AL 3,520,991

COLOR TELEVISION RECEIVER TINT AND CHROMA CONTROL NETWORK

Filed Oct. 26, 1967 2 Sheets-Sheet 2

INVENTORS
DONG W. RHEE &
KAROL SIWKO

BY Robert E. Strauser

ATTORNEY

United States Patent Office 3,520,991
Patented July 21, 1970

3,520,991

COLOR TELEVISION RECEIVER TINT AND CHROMA CONTROL NETWORK

Dong W. Rhee, Williamsville, and Karol Siwko, Batavia, N.Y., assignors to Sylvania Electric Products, Inc., a corporation of Delaware Filed Oct. 26, 1967, Ser. No. 678,347
Int. Cl. H04n 9/12
U.S. Cl. 178—5.4 8 Claims

ABSTRACT OF THE DISCLOSURE

In a color television receiver a single conductor shielded cable is utilized to provide convenient location for the viewer of both a tint and a chroma control. The tint and chroma control network includes the single conductor shielded cable coupling the controls to a signal source with the tint control employing a parallel connected inductor and capacitor each having one terminal interconnected by an alterable resistor having an adjustable arm.

BACKGROUND OF THE INVENTION

Present-day color television receivers normally include a chroma amplifier wherefrom composite color signals including chrominance signals and color burst signals are applied to a bandpass amplifier stage and to a color burst stage. The bandpass amplifier stage separates and intensifies the chrominance information while the color burst stage separates and intensifies the color burst signals.

Usually, the intensified chrominance information available from the bandpass amplifier stage is applied via a shielded cable to a manually adjustable color or chroma control available to the viewer. This color or chroma control permits manual variations in the amplitude of the chrominance signals applied to a demodulation system and, in turn, variations in the color saturation of a viewed image appearing on the screen of a color picture tube.

Similarly, the intensified color burst signals available from the color burst stage are applied via a shielded cable to a manually adjustable tint or color control available to a viewer. The tint or color control permits the viewer to shift the phase of the color burst signals applied to the demodulation system and, in turn, shift the color of a viewed image appearing on the screen of a color picture tube.

While the above-described technique has received widespread acceptance and enhanced reproduction of images viewed by the color television camera, it has been found that such a system still leaves something to be desired. For instance, it is desirable to provide both the color or chroma control and the tint or hue control in relatively adjacent locations as a convenience to the viewer. However, including the color or chroma control in the chrominance signal circuitry and the tint or hue control in the color burst signal circuitry normally requires two separate shielded cables which, in addition to being costly, tend to increase harmonic radiation and circuit instability.

Further, it has been found relatively difficult to optimize the operation of either the color burst or chrominance circuitry when each includes some form of manual adjustment means. Specifically, most tint or hue control circuitry includes a parallel resonant circuit shunted by an alterable resistor. Thus, a varying amount of resistance is introduced into the resonant circuitry which is not only deleterious to the efficiency but also, in case of the color burst circuitry, tends to cause an undesired variation in the amplitude of the color burst signals and, through the usual well-known automatic chroma control systems, an undesired change in amplitude of the chrominance signals.

As a result, it has been found that the known chroma and tint control networks are relatively complex and expensive. Moreover, all of the known chroma and tint control networks have a deleterious effect upon the operation of a color television receiver.

OBJECTS AND SUMMARY OF THE INVENTION

Therefore, it is an object of the present invention to provide an enhanced tint and chroma control network for a color television receiver. Another object of the invention is to provide an improved tint and chroma control network which enhances the operation of a color television receiver. A further object of the invention is to provide a tint and chroma control network which is of simple construction, economical of materials and labor, and disposed for convenient adjustment by a television viewer.

These and other objects, advantages and capabilities thereof, are achieved in one aspect of the invention by a tint and chroma control network coupled to a signal source by a single conductor shielded cable. The network includes a parallel connected inductor and capacitor each having one terminal interconnected by a first alterable resistor having an adjustable arm with a second alterable resistor having an adjustable arm coupled thereto. Varying the positional location of the adjustable arm of the alterable resistors provides a desired shift in phase and magnitude of an applied signal.

DESCRIPTION OF THE PREFERRED EMBODIMENTS

For a better understanding of the invention as well as other and further objects, advantages and capabilities thereof, the following disclosure should be considered in conjunction with the accompanying drawings and appended claims.

Figure 1:
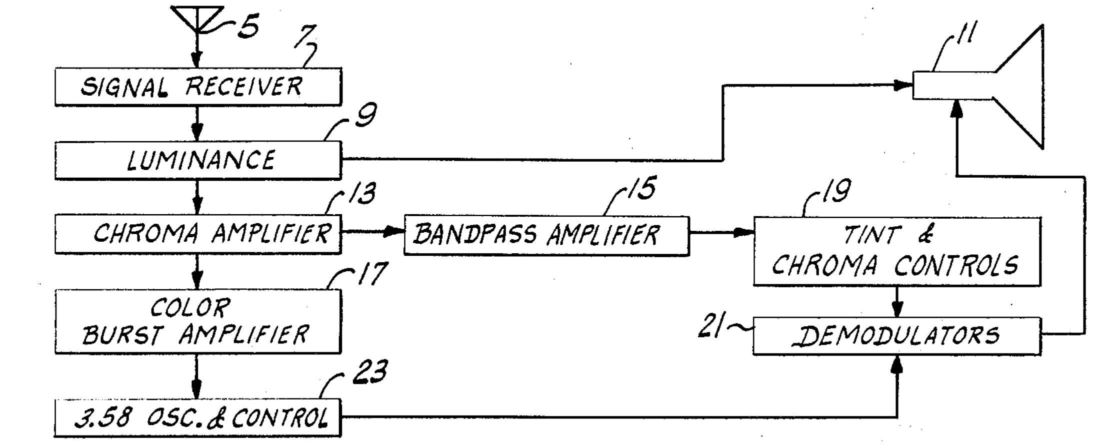
FIG. 1 illustrates, in block form, a portion of a color television receiver showing a preferred location of one embodiment of the invention.

Referring to the drawings, FIG. 1 illustrates, in block form, a portion of a typical color television receiver showing a preferred location of one embodiment of the tint and chroma control network. The receiver includes the usual antenna 5 and signal receiver 7 including the well-known radio frequency (RF) and intermediate frequency (IF) amplification and detection stages wherefrom a composite color signal is applied to a luminance channel 9.

The luminance channel 9 includes the usual video amplification and detection stages as well as a delay line and provides a luminance signal representative of variations in brightness of a viewed image. This luminance signal is applied in a well-known manner to an electrode of a color picture tube 11. Also, the video signal from the luminance channel 9 is applied to a chroma amplifier stage 13 by way of a trapping network whereby the luminance portion of the signal is eliminated, for all practical purposes, and a composite color signal including both chrominance information and color burst signals appears at the input of the chroma amplifier stage 13.

The chroma amplifier stage 13 intensifies the composite color signal which is then applied to a bandpass amplifier stage 15 and to a color burst amplifier stage 17. The bandpass amplifier stage 15 separates and intensifies the chrominance portion from the composite color signal and applies this chrominance portion of the signal by way of a tint and chroma control network 19, which will be further explained hereinafter, to a demondulation system 21.

Also, the intensified chrominance portion of the composite color signal available from the chroma amplifier stage 13 is applied to the color burst amplifier stage 15 which is keyed to provide an intensified color burst signal which is, in turn, applied to an oscillator and control network 23. The oscillator and control network 23 develops a reference oscillation signal, in a well-known manner, which is also applied to the demodulation system 21.

The demodulation system 21 utilizes the applied chrominance signals and reference oscillation signals to provide a plurality of color difference signals which are applied to the electrodes of the color picture tube 11. In the color picture tube 11, the signals available from the luminance channel 9 and from the demodulation system 21 are combined to provide signals and a color image display representative of an image viewed by a color television camera.

Referring to the tint and chroma control network 19, it is well known that both the tint control and the chroma control are manually operable controls which should be readily accessible to the viewer of a television receiver. Moreover, it can be readily understood that good circuitry design and convenient accessibility to the viewer of such controls are not necessarily or even usually compatible requirements. Thus, enhancement of both circuitry design and viewer control accessibility is desirable.

Figure 2:
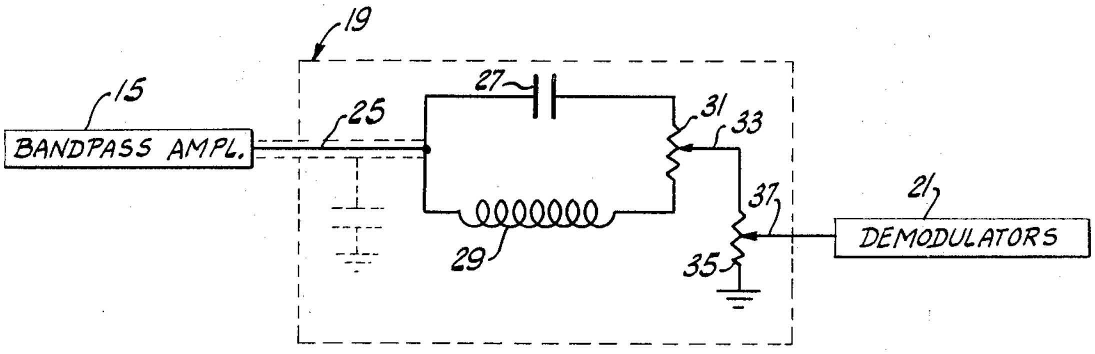
FIG. 2 illustrates, in block and schematic form, an embodiment of a tint and chroma control network of the invention.

Referring to the embodiment of FIG. 2, a tint and chroma control network 19 includes a single conductor shielded cable 25, a parallel connected capacitor 27 and inductor 29 each having one terminal connected to the cable 25 and the other terminal interconnected by a first adjustable resistor 31 having an alterable arm 33. The alterable arm 33 of the first adjustable resistor 31 is coupled to a voltage reference level such as circuit ground by a second adjustable resistor 35 having an alterable arm 37 coupled to the demodulator system 21.

As to the operation of the embodiment of FIG. 2, it can readily be understood that the parallel connected capacitor 27 and inductor 29 in conjunction with the adjustable resistor 31 form a balanced tint or hue control circuit whereby the phase of an applied signal may be shifted by varying the location of the alterable arm 33. Further, it has been found that the impedance of the balanced control circuit remains relatively constant throughout the desired range of phase shifted signals.

Figure 3:
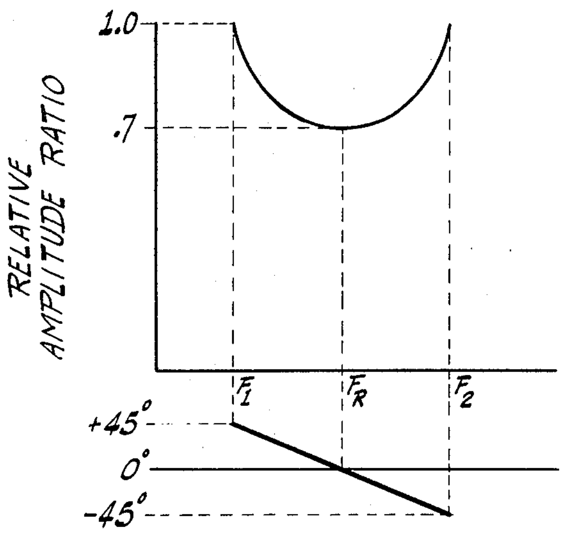
FIG. 3 illustrates a typical amplitude-frequency-phase shift response curve of the embodiment of FIG. 2.

More specifically, the amplitude-frequency-phase shift illustration of FIG. 3 is indicative of the fact that the desired shift in phase, usually about +45° to −45° from a resonant frequency, is obtainable with but a small variation in amplitude of an applied signal. Further, it has been found that a relatively small shift in amplitude, about 3db, occurs as the phase is shifted from a resonant frequency $F_r$ to a frequency, $F_1$ and $F_2$, of about ±45° from resonance. Moreover, it has been found that the magnitude of the signal increases with an increase in phase shift from resonance.

Also, this phase shifted chrominance signal available at the alterable arm 33 of the first adjustable resistor 31 is directly coupled to a second adjustable resistor 35 connected to circuit ground. This second adjustable resistor 35 serves as a chroma or color control wherein the adjustable arm 37 is utilized to select the desired magnitude of phase shifted signal appearing thereacross. Thus, a signal of a desired phase shift and magnitude is available at the alterable arm 37 of the second adjustable resistor 35 and this signal is applied to the demodulation system 21.

As previously mentioned, both the tint and color controls must be readily accessible to the viewer. Thus, the above-described substantially series coupled tint and chroma control configuration permits the utilization of one single conductor shielded cable 25 whereby both the tint and chroma controls may be remotely located from the receiver circuitry for manual operation by the viewer.

Figure 4:
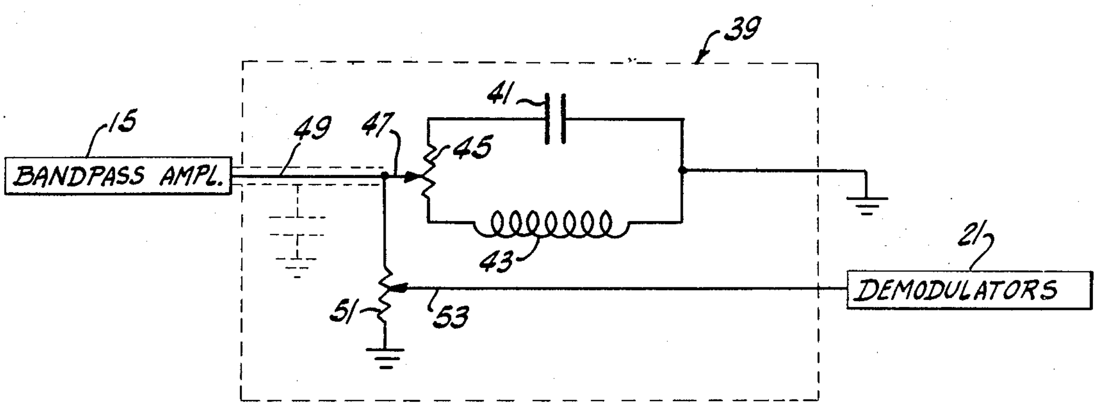
FIG. 4 illustrates, in block and schematic form, another embodiment of a tint and chroma control network of the invention.

In another embodiment of the invention, FIG. 4 illustrates the bandpass amplifier stage 15 and demodulator system 21 interconnected by another tint and chroma control network 39. Herein, the tint control network includes a parallel connected capacitor 41, and inductor 43 each having one terminal connected to a voltage reference level and the other terminals interconnected by a first adjustable resistor 45 having an alterable arm 47. The alterable arm 47 is coupled by way of a single conductor shielded cable 49 to the bandpass amplifier stage 15 and to a voltage reference level by way of a second adjustable resistor 51 having an alterable arm 53 coupled to the demodulation system 21.

The operation of the tint and chroma control network 39 is somewhat similar to the operation of the above-described tint and chroma control network 19. Essentially, the chrominance signal available at the bandpass amplifier stage 15 is applied via the one single conductor shielded cable 49 to the alterable arm 57 of the adjustable resistor 45 coupled to one terminal of the capacitor and inductor 43 forming a tint control circuit and to the resistor 51 having an alterable arm 53 and forming a chroma control circuit. Thus, the phase of the chrominance signal is shifted as the alterable arm 47 is positionally shifted and the magnitude of the phase shifted signal is varied in accordance with the positional location of the alterable arm 53 of the second adjustable resistor 51.

Again, it should be noted that the impedance value of the resonant network which includes the capacitor 41, inductor 43, and resistor 45 remains substantially constant regardless of the positional location of the alterable arm 47 whereon the degree of signal phase shift is dependent. Moreover, the substantially parallel connected relationship of the tint and chroma control circuits of the network 39 provide a reduced impedance intermediate the demodulator system 21 and bandpass amplifier stage 15 enhancing signal transfer and reducing power loss therebetween.

Figure 5:
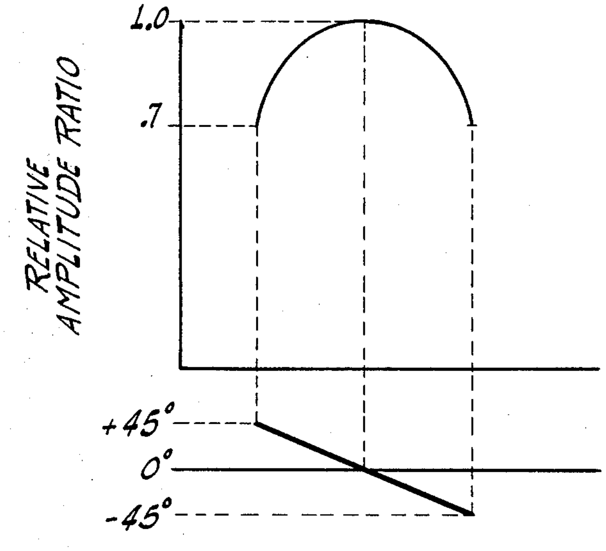
FIG. 5 illustrates a typical amplitude-frequency-phase shift response curve of the embodiment of FIG. 4.

More specifically, the amplitude-frequency-phase shift illustration of FIG. 5 diagrammatically shows the relatively small, about 3 db for a phase shift of ±45°, decrease in amplitude of an applied signal as the phase is shifted from a resonant frequency $F_r$ to an angle of ±45°, $F_1$ and $F_2$. As a result, the efficiency of the circuitry remains relatively constant throughout the desired variations in phase.

Additionally, it should be noted that the above-described tint and chroma control network is also applicable to the signals available from the color burst amplifier stage 17 of FIG. 1. In other words, the tint and chroma control network can be coupled by a single conductor shielded cable to signals available from the color burst amplifier stage 17. In such embodiments, the phase and amplitude of the color burst signals may be manually varied permitting enhanced optimization of the chrominance signal circuitry and of the color television receiver.

Thus, there has been provided a unique tint and chroma control network having numerous advantages over prior known circuitry. The network permits remote location of both the manually operable tint and chroma controls with but one single conductor shielded cable thereby reducing complexity and cost in both materials and labor. Also, the network permits optimization of either the chrominance or oscillator and control circuitry of the receiver thereon. Further, the phase shift portion of the network by eliminating undesired variations and loading effects thereon. Further, the phase shift portion of the network includes a substantially constant ohmic value regardless of variations in phase shift and therefore operates at a desired substantially constant efficiency.

We claim:

1. In a color television receiver having a source of chrominance signals, a source of reference oscillation signals, and a signal demodulation system, a tint and chroma control network comprising in combination:

means for shifting the phase and amplitude of a signal from one of the signal sources, said means including a parallel connected inductor and capacitor each having one terminal interconnected and a second terminal interconnected by a first alterable resistor having an adjustable arm and a second alterable resistor coupling said adjustable arm to a voltage reference level, said second alterable resistor having an adjustable arm;

means for coupling a signal from one of said signal sources to said means for shifting the phase and amplitude of a signal; and means for coupling a phase and amplitude shifted signal from said adjustable arm of said second alterable resistor of said phase and amplitude shifting means to said demodulation system.

2. The tint and chroma control network of claim 1 wherein said means for coupling a signal from one of said signal sources to said means for shifting the phase and amplitude of the signal is in the form of a single conductor shielded cable.

3. The tint and chroma control network of claim 1 wherein said parallel connected inductor and capacitor each having one terminal interconnected by said first alterable resistor and said second alterable resistor are substantially series coupled intermediate one of said signal sources and said signal demodulation system.

4. The tint and chroma control network of claim 1 wherein said parallel connected inductor and capacitor each having one terminal interconnected by a first alterable resistor and said second alterable resistor are substantially parallel coupled intermediate one of said signal sources and said signal demodulation system.

5. The tint and chroma control network of claim 1 wherein said means for coupling a signal from one of said signal sources to said means for shifting the phase and amplitude of the signal is in the form of a single conductor shielded cable interconnecting the signal source and the other terminal of said parallel connected inductor and capacitor.

6. The tint and chroma control network of claim 5 wherein said signal source is a chrominance signal source.

7. The tint and chroma control network of claim 1 wherein said means for coupling a signal from one of said signal sources to said means for shifting the phase and amplitude of the signal is in the form of a single conductor shielded cable interconnecting the signal source and the adjustable arm of said first and second alterable resistors.

8. The tint and chroma control network of claim 7 wherein said signal source is a chrominance signal source.

References Cited

UNITED STATES PATENTS

| | | | |
|---|---|---|---|
| 2,881,245 | 4/1959 | Fenton et al. | |
| 2,909,594 | 10/1959 | Schlesinger | 178—5.4 |
| 3,436,470 | 4/1969 | Konkel et al. | |

RICHARD MURRAY, Primary Examiner